(12) United States Patent
Schmidt

(10) Patent No.: US 7,793,277 B2
(45) Date of Patent: Sep. 7, 2010

(54) COMPILER APPARATUS AND METHOD FOR DEVIRTUALIZING VIRTUAL METHOD CALLS

(75) Inventor: William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2524 days.

(21) Appl. No.: 09/948,749

(22) Filed: Sep. 7, 2001

(65) Prior Publication Data

US 2003/0051234 A1    Mar. 13, 2003

(51) Int. Cl.
    G06F 9/45    (2006.01)
(52) U.S. Cl. ........................... 717/158; 717/146
(58) Field of Classification Search .................. 717/114, 717/146, 157–158
    See application file for complete search history.

(56) References Cited

U.S. PATENT DOCUMENTS 6,175,956 B1 * 1/2001 Hicks et al. ................. 717/114
6,526,571 B1 * 2/2003 Aizikowitz et al. .......... 717/154

OTHER PUBLICATIONS

Zaks et al., "Sealed calls in Java packages", Proceedings of the 15th ACM SIGPLAN conference on Object-oriented programming, systems, languages, and applications, pp. 83-92, 2000.*
Biberstein et al., "A Case for Sealing Classes in Java", retrieve from Internet <www.haifa.il.ibm.com/info/ple/papers/class.pdf>, May 9, 2002 on Aug. 8, 2004.*
Schmidt et al., "Profile-directed Restructuring of Operating System Code", IBM Systems Journal vol. 37, No. 2, 1998.

* cited by examiner

*Primary Examiner*—James Rutten
(74) *Attorney, Agent, or Firm*—Martin & Associates, LLC; Derek P. Martin

(57) ABSTRACT

A front-end compiler generates unique instructions for virtual method calls in intermediate representation code that may be passed to a back-end compiler. A back-end compiler in accordance with the preferred embodiments receives the intermediate representation code, and processes the unique instructions to generate therefrom equivalent code with explicit method calls, where possible. The machine code from the back-end compiler is then executed using sample inputs to generate profile data. The profile data and intermediate representation code are fed into the back-end compiler, which then generates code that may devirtualize virtual method calls according to the profile data by providing one or more explicit method calls for target methods that have an execution frequency (as indicated by the profile data) that exceeds a predetermined threshold.

32 Claims, 10 Drawing Sheets

```
void fastDecay(Fruit myFruit) {
        myFruit.rot(100);
}
```

```
if (myFruit isOfType Orange) {
        call Orange.rot() using myFruit as the "this" pointer
} else {
        Fruit.rot() // the normal virtual call (covers Fruit and Banana)
}
```

```
push 100;                                                                    810
push addressing expression for called procedure;                             820
CALLPP D1,1; // D1 is a dictionary entry describing the function             830
    call parm types; 1 indicates the number of
    pushed arguments
```

FIG. 8  Prior Art

```
push 100;                                                                    910
push addressing expression for method_info of rot() function in              920
    myFruit's virtual function table;
push addressing expression for method_info of Fruit.rot();                   930
push addressing expression for method_info of Orange.rot();                  940
push addressing expression for method_info of Banana.rot();                  950
push addressing expression for called procedure;                             960
JXPDVIRT D1,3,1; //D1 is the dictionary entry from the CALLPP;               970
    3 known targets (D100, D200 and D300); 1 argument on the stack
JXDEVTGT D100;        982
JXDEVTGT D200;        984
JXDEVTGT D300;        986
```

FIG. 9

```
push 100;                                                                           1010
if (run-time target method_info address = method_info address for D100) then        1020
                                                          // equivalent to type test
    CALLBP D100,1; // bound procedure call to a known target                        1030
else if (run-time target method_info address = method_info address for D200) then   1040
    CALLBP D200, 1; // bound procedure call to a known target                       1050
else if (run-time target method_info address = method_info address for D300) then   1060
    CALLBP D300, 1; // bound procedure call to a known target                       1070
else
    push addressing expression for called procedure;                                1080
    CALLPP D1, 1;    // fall back to a virtual method call if none of the           1090
                        known targets are found
endif
```

FIG. 10

```
push 100;                                                                    1410
if (run-time target method_info address = method_info address for D200) then  1420
        CALLBP D200,1; // explicit call to Orange.rot()                       1430
else if (run-time target method_info address = method_info address for D100) then 1440
        CALLBP D100, 1; // explicit call to Fruit.rot()                       1450
else
        push addressing expression for called procedure;                     1460
        CALLPP D1, 1;    // fall back to a virtual method call if none of the  1470
                         known targets are found
endif
```

FIG. 14

COMPILER APPARATUS AND METHOD FOR DEVIRTUALIZING VIRTUAL METHOD CALLS

BACKGROUND OF THE INVENTION

1. Technical Field

This invention generally relates to computer systems, and more specifically relates to compilers that generate executable code for computer systems.

2. Background Art

Since the dawn of the computer age, computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the arrangement and type of instructions within the computer program. Branch instructions are one type of instruction that may affect the execution time of a computer program. A branch instruction may cause the processor to go (i.e., branch) to a different part of the computer program to execute instructions. If a computer program contains many branch instructions, the time spent branching from one portion of the program to the next may introduce delays. Judicious selection of the order of portions of the computer program may improve the program's execution time by placing portions that are executed sequentially in sequential order.

In order to optimize the performance of modern computer programs, profilers have been developed to predict and/or measure the run-time performance of a computer program. Profilers typically generate profile data that estimates how often different portions of the computer program are executed. Using profile data, an optimizer (such as an optimizing compiler) may make decisions regarding the preferred order of different portions of the computer program in order to optimize the execution speed of the computer program.

Known prior art systems generate profile data that is used by a compiler to determine the order of portions of a computer program. However, the known methods for using profile data in reordering portions of a computer program do not provide an optimal solution. For example, in the prior art, virtual method calls in an object oriented computer program cannot be optimized because the compiler does not know at compile-time which method at run-time will be the actual method being invoked. As a result, the prior art may still yield inefficiencies in the structure of the code that result in a slower execution time for the computer program. Without improved apparatus and methods for devirtualizing virtual method calls in an object oriented computer program, these method calls will remain unaffected by any optimization performed by the compiler, resulting in a computer program that is not as fully optimized as it might be.

DISCLOSURE OF INVENTION

According to the preferred embodiments, a front-end compiler generates unique instructions for virtual method calls in intermediate representation code that may be passed to a back-end compiler. A back-end compiler in accordance with the preferred embodiments receives the intermediate representation code, and processes the unique instructions to generate therefrom equivalent code with explicit method calls, where possible. The machine code from the back-end compiler is then executed using sample inputs to generate profile data. The profile data and intermediate representation code are fed into the back-end compiler, which then generates code that may devirtualize virtual method calls according to the profile data by providing one or more explicit method calls for target methods that have an execution frequency (as indicated by the profile data) that exceeds a predetermined threshold.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 8 shows pseudo-code that is created in the prior art for a virtual method call in the source code;

FIG. 9 shows pseudo-code that is created in accordance with the preferred embodiments for a virtual method call of FIG. 4;

FIG. 10 shows pseudo-code that may be created by the back-end compiler in accordance with the preferred embodiments from the JXPDVIRT and JXDEVTGT instructions in FIG. 9;

FIG. 14 shows pseudo-code that results from optimizations of devirtualized method calls in accordance with the preferred embodiments.

BEST MODE FOR CARRYING OUT THE INVENTION 1.0 Overview

The present invention relates to optimizing virtual method calls in an object oriented computer program. For those not familiar with compilers or virtual method calls, this Overview section will provide background information that will help to understand the present invention.

Known Compilers

Figure 1:
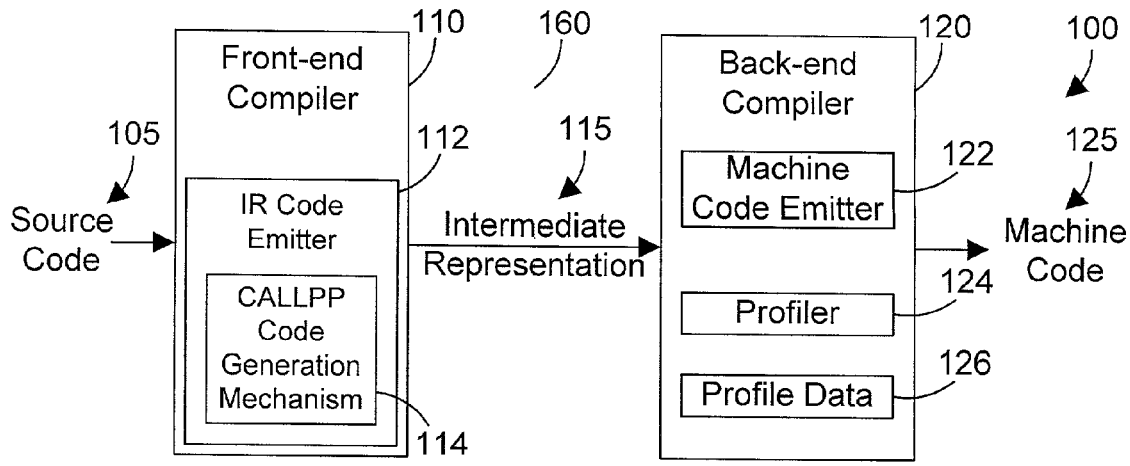
FIG. 1 is a block diagram of a prior art compiler system.

FIG. 1 illustrates a prior art compiling system 100 that includes a front-end compiler 110 and a back-end compiler 120. For most known compilers, there is an architected division (indicated by dotted line 160) between the front-end compiler 110 and the back-end compiler 120. Front-end compilers 110 are used to convert source code 105 to an intermediate representation 115. Back-end compilers 120 are used to convert the intermediate representation 115 to machine code 125 for a particular hardware configuration (i.e., platform). This designed division between front-end compilers and back-end compilers is efficient, because it allows front-end compilers for a number of different languages (e.g., C++, Java, Ada, etc.) to be used with a single back-end compiler for a given platform (e.g., IBM iSeries). Likewise, a single front-end compiler for the Java programming language can be used with multiple back-end compilers if the code needs to be compiled to run on different platforms.

Front-end compiler 110 includes an IR code emitter 112 that processes the source code 105 and emits instructions in intermediate representation 115. IR code emitter 112 includes a CALLPP code generation mechanism 114 that recognizes virtual method calls in the source code 105, and that replaces the virtual method call with IR code that includes a CALLPP instruction, as explained in more detail below. Back-end compiler 120 includes a machine code emitter 122 that processes the intermediate representation 115 and emits machine code 125 that is executable on a particular platform. Back-end compiler 120 also includes a profiler 124 that is used to obtain profile data 126 when the machine code 125 is run with a set of sample inputs. As used herein, the term "sample inputs" means inputs that simulate real-world execution of the machine code in its intended environment. Machine code emitter 122 includes the capability of using profile data 126 to optimize the machine code 125 by processing the intermediate representation code 115 a second time according to the profile data. Note, however, that a CALLPP instruction in the prior art cannot be optimized because the exact method being invoked is not known at compile-time.

Profile-based Optimizations in Known Compilers

Figure 2:
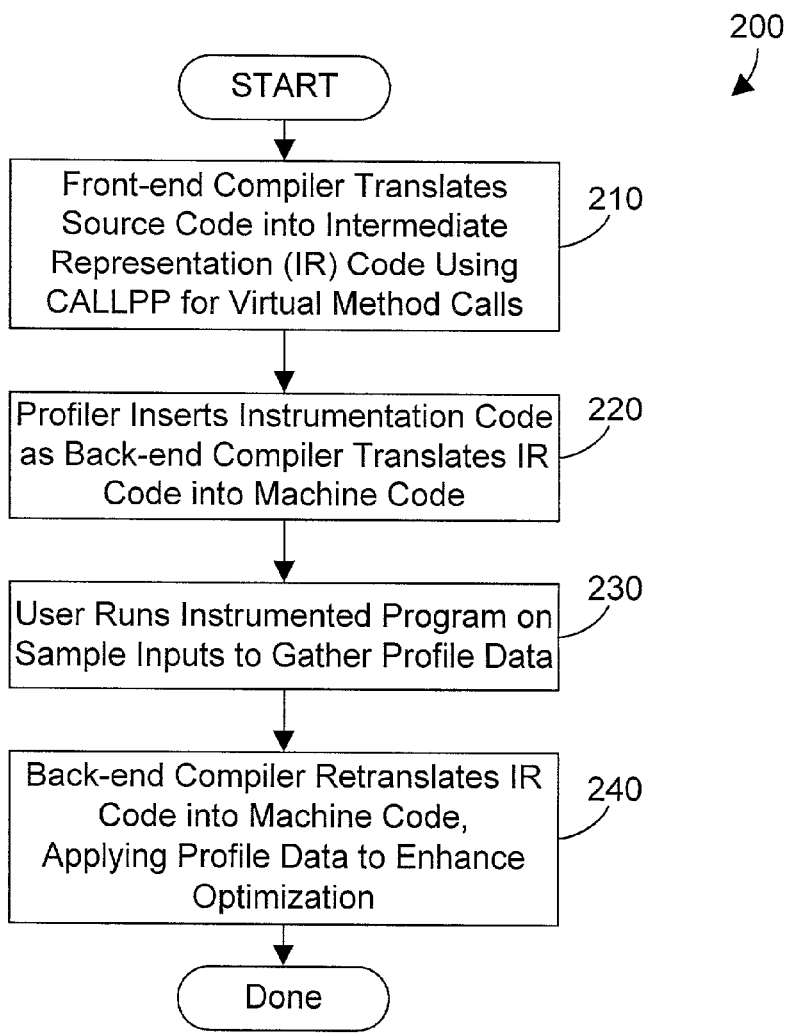
FIG. 2 is a flow diagram showing steps in a prior art method for compiling source code using the compiler system of FIG. 1.

FIG. 2 is a flow diagram of a method 200 for compiling source code using the prior art compiling system 100 in FIG. 1. First, the front-end compiler translates the source code into intermediate representation (IR) code using the CALLPP instruction for virtual method calls (step 210). Next, the back-end compiler processes the intermediate representation, inserting instrumentation code into the machine code (step 220). Instrumentation code is code that typically increments counters to keep track of how many times each branch in the machine code 125 is executed when the machine code 125 is executed with a sample set of inputs that are designed to simulate the real-world environment for executing the machine code 125. Once the instrumentation code is inserted into the machine code 125, the instrumented program (i.e., machine code) is run using sample inputs, and profile data regarding the execution is gathered (step 230). For the case of instrumented code, the profile data consists of count values for each branch in the machine code that indicate the number of times the branch was executed. The backend compiler then retranslates the IR code into machine code, applying the profile data to enhance optimization of the computer program (step 240). A necessary condition for the profiling process is that the code must look identical or nearly identical to the compiler on both passes, so that the gathered profile data makes sense when applied to the code during the second compilation. There are thus two choices. In one case, the code can be compiled both times from the source code. This means that both the front-end compiler and the back-end compiler will execute both times. Another possibility is for the front end to run only the first time, saving the intermediate language code that it produces. In this scenario, only the back-end compiler runs twice. The second time, the compilation starts from the saved intermediate language code.

We see from FIGS. 1 and 2 that, in the prior art, profile-based optimizations are typically done in the back-end compiler. Because profiling is normally done on code that represents the actual flow of control in a computer program, it is logical that profiling be done by the back-end when converting the intermediate representation 115 to machine code 125. If profiling were done in the front-end compiler, every front-end compiler produced would have to implement its own method for gathering profile data by either inserting instrumentation hooks, or by producing mapping tables for sampling. Furthermore, front-end compilers typically operate at a higher level of abstraction than back-end compilers, so that a single operation in the representation of a program used by the front-end compiler may be converted into complex control flow in the back-end compiler. Thus many low-level branches cannot be instrumented by a profiling system in a front-end compiler. Since most of the information needed for profile-based optimizations is confined to knowing how frequently branches are taken versus not-taken, the method for gathering profile data can be performed on any intermediate representation appropriate for the back-end compiler. For this reason, prior art systems typically have profiling-based optimizations only in the back-end compiler.

Method 200 of FIG. 2 assumes in step 220 that the profiler inserts instrumentation code into the machine code. Note, however, that profiling may also occur via sampling, which uses a time-based interrupt in the operating system to periodically halt program execution and determine the current address. Sampling does not require the insertion of instrumentation code, and is another known way to collect profile data. In general sampling is less intrusive than inserting instrumentation code, but it is also correspondingly less accurate. Sampling is limited to identifying which blocks of code are frequently executed, but does not generally indicate which branches were taken to get to the frequently-executed blocks.

Virtual Method Calls in an Object Oriented Program

Figures 3, 4, 5:
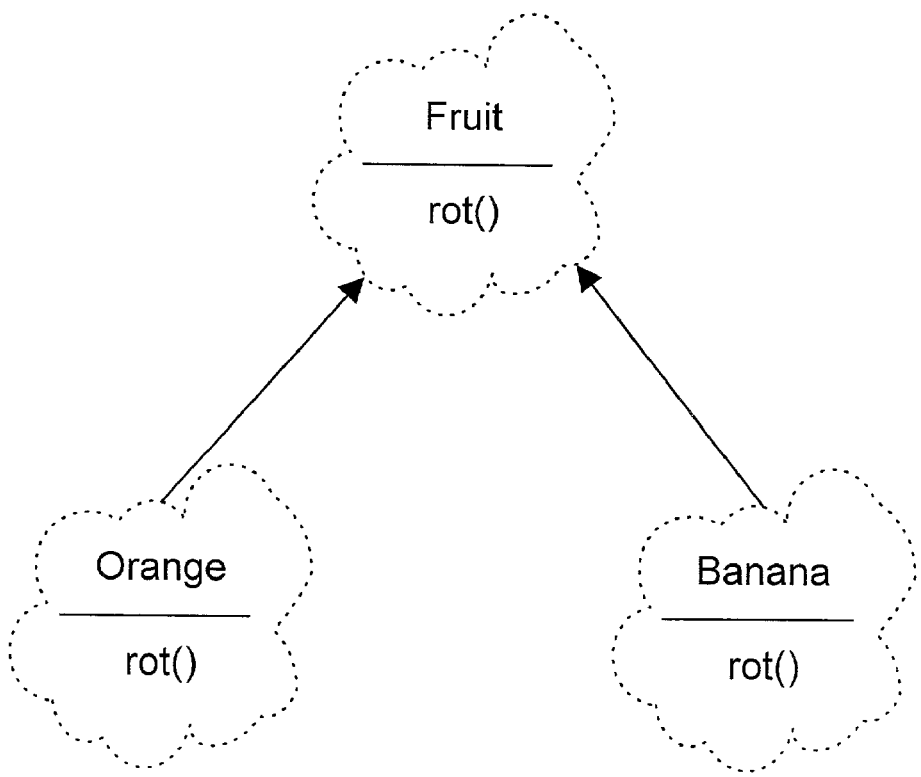
FIG. 3 is a block diagram of a sample class hierarchy for illustrating deficiencies in the prior art and for illustrating the preferred embodiments of the present invention.
FIG. 4 shows pseudo-code for a virtual method call for the example of FIG. 3.
FIG. 5 shows one way to potentially expand the code of FIG. 4 to determine which method is invoked at run-time, assuming the front-end compiler can expand the code as shown.

FIGS. 3 and 4 illustrate the problem with virtual method calls in object oriented programs. Referring to the class diagram of FIG. 3, a class Fruit is defined with a virtual method rot( ) that models how quickly a Fruit decays based on an input duration parameter. An Orange class and a Banana class are defined as subclasses of the Fruit class. We assume for this example that the Orange class and Banana class each override the rot( ) method in the Fruit class with their own internal implementation. Now referring to FIG. 4, for the method fastDecay( ), the myFruit parameter could point to an instance of Fruit, Orange, or Banana, so the call to myFruit.rot( ) could call any of Fruit.rot( ), Orange.rot( ), or Banana.rot( ) at run-time. The term "virtual method call" is used herein to denote a method call that may potentially call more than one method at run-time. The set of methods that may be invoked at run-time by a virtual method call are referred to herein as "target methods" for the virtual method call. Because the specific method to be called by a virtual method call cannot be identified at compile-time, known compilers and profile-based optimizers do not perform any optimizations for virtual method calls.

One way to allow optimizations for a virtual method call is to generate equivalent code with branches that indicate the frequency of invoking each method according to profile data generated at run-time. For the classes of FIG. 3 and the fastDecay( ) method in FIG. 4, we assume that the profile data indicates that the Fruit.rot( ) method was invoked 110 times, the Orange.rot( ) method was invoked 150 times, and the Banana.rot( ) method was invoked only twice. One way to optimize the virtual method call in fastDecay( ) is to generate equivalent code in FIG. 5 that devirtualizes the calls. FIG. 5 shows that if the myFruit object is an instance of the Orange class, the Orange.rot( ) method is explicitly called. Otherwise, the Fruit.rot( ) virtual call is assumed, which covers both the Fruit.rot( ) and Banana.rot( ) methods. This type of optimization would be very useful, because a compiler could then reorder portions of the computer program according to take advantage of the high percentage of time the Orange.rot( ) method is called. Note, however, that the optimization in FIG. 5 cannot be performed by known compilers in the art. As stated above, known compilers have the architected division between front-end and back-end, and the profilers are typically located in the back-end compiler. For this reason, the optimization in FIG. 5 cannot be done in the back-end compiler, because all concept of type systems is typically gone in the intermediate representation that is fed to the back-end compiler. The back-end compiler cannot generate the "isOfType Orange" predicate because it is totally ignorant of class hierarchies.

At first glance, one might think that most of the profiling work could still be done in the back-end compiler if the front-end were to collect type data. However, this proposed implementation gives rise to many practical concerns. Note that the front end would have to participate in both the instrumentation and optimizing compiles. The original code given to the back end in the example of FIG. 4 has a single call to myFruit.rot( ), but the optimized code with devirtualization in FIG. 5 contains some added control flow. So the set of branches seen by the back end is different from the first time around, meaning that complex bookkeeping is needed to keep track of which branches correspond to the originals and which were introduced by this optimization. If additional front-end optimizations based on profile data are added, then this mechanism quickly breaks down as impractical due to the changes in the branching structure of the program caused by the optimizations. The branching structure of the intermediate code produced by the front end may be so different with and without profile data that matching up branches in the back-end compiler between the two passes could become even more difficult.

Another option is to do all the profiling in the front-end compiler, so that the code (i.e., source code) presented to the profiling mechanism looks the same on both compiles. However, profiling in the front-end violates the architected division (160 of FIG. 1) between front-end compilers and back-end compilers, which means that each front-end compiler must have its own profiling system. The deficiencies in the prior art give rise to a need for some mechanism and method for permitting type-dependent optimizations, such as devirtualization, to be handled by a back-end profiling compiler.

2.0 Detailed Description

The preferred embodiments provide a back-end compiler that can perform devirtualization of virtual method calls in a computer program. A front-end compiler inserts unique instructions for each virtual method call in the emitted intermediate representation fed to the back-end compiler. The back-end compiler then translates the unique instructions into equivalent code that devirtualizes the method call in the machine code. Profile data is then gathered from executing the machine code from a set of sample inputs. The back-end compiler can then determine from the profile data the frequency of executing each explicit method call, and can generate appropriate equivalent code according to the profile data that devirtualizes the virtual method call and optimizes the performance of the machine code.

Figure 6:
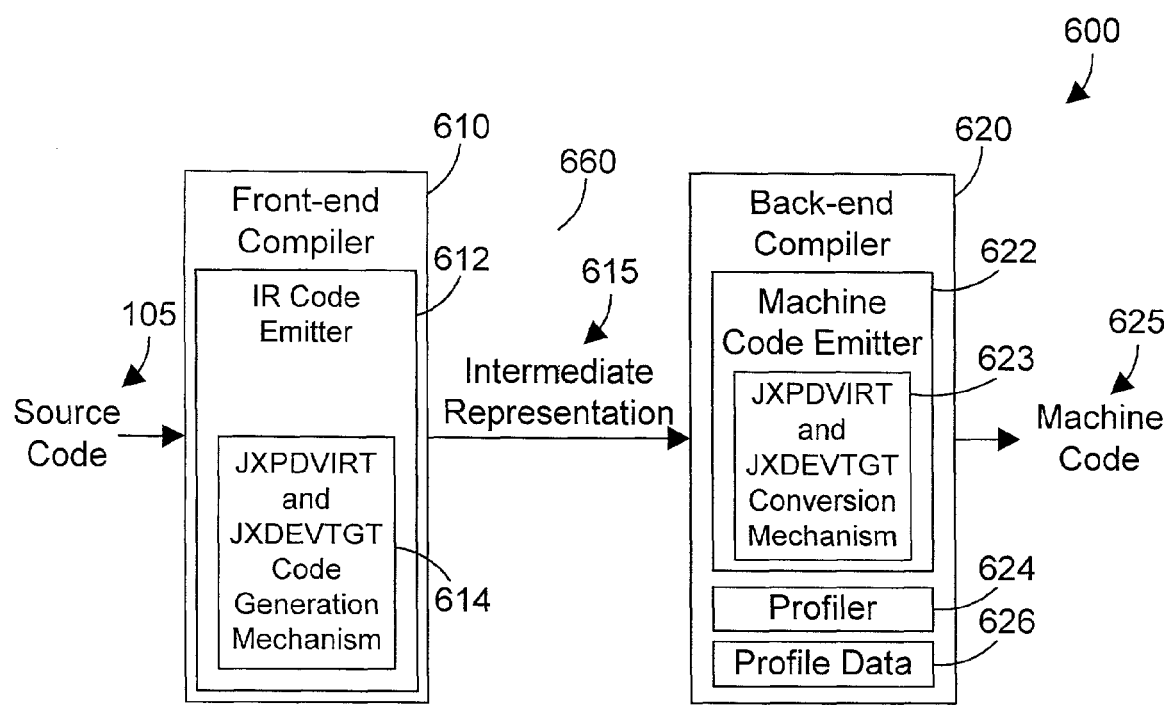
FIG. 6 is a block diagram of a compiler system in accordance with the preferred embodiments.

Referring now to FIG. 6, a compiling system 600 of the preferred embodiments includes a front-end compiler 610 and a back-end compiler 620. The front-end compiler 610 processes source code 105, and generates therefrom an intermediate representation 615 that is fed to the back-end compiler 620. Back-end compiler 620 processes the intermediate representation 615, and generates therefrom machine code 625. Note that the architected division 660 between front-end compiler 610 and back-end compiler 620 is maintained, allowing any suitable front-end compiler 610 to generate intermediate representation code 615 for any compatible back-end compiler 620. While the basic flow from source code 105 to intermediate representation 615 to machine code 625 in FIG. 2 is the same as the prior art flow in FIG. 1 from source code 105 to intermediate representation 115 to machine code 125, there are differences in how the front-end compiler 610 emits the intermediate representation 615, and how the back-end compiler 620 processes the intermediate representation 615 and generates the machine code 625. These differences are discussed in detail below.

The front-end compiler includes an IR code emitter 612 that emits the intermediate representation 615. Note that IR code emitter 612 could directly emit the intermediate representation 615 itself, or could emit an instruction stream that could be easily converted (one-to-one) to the intermediate representation 615. IR code emitter 612 includes a JXPDVIRT and JXDEVTGT code generation mechanism 614 that emits these instructions into the intermediate representation

615 for each virtual method call in the source code 105. The preferred embodiments expressly extend to any front-end compiler that processes object oriented source code and generates therefrom an instruction stream (e.g., intermediate representation 615) that includes one instruction (e.g., JXPD-VIRT) that indicates a virtual method call, and one or more other instructions (e.g., JXDEVTGT) that identifies a potential target method for the virtual method call.

The machine code emitter 622 within the back-end compiler 620 includes a JXPDVIRT and JXDEVTGT conversion mechanism 623 that translates these instructions to equivalent code for the purpose of profiling. Once the profiler 624 has generated profile data 626 for the machine code that is output by the machine code emitter 622, the profile data 626 may be examined to determine how often each target method that corresponds to a virtual method call was actually invoked during the sample execution of the machine code. If the frequency of execution is sufficiently high for a particular target method, separate code is generated that explicitly invokes the particular target method. If the frequency of execution is too low (according to any suitable heuristic), no explicit call is generated in the final machine code. In this case, the traditional CALLPP that is generated in the prior art is used to represent portions of the virtual method call that are not devirtualized. In this manner, optimizations may be performed on code portions that include virtual method calls, rather than simply assuming (as does the prior art) that optimizations cannot be performed because the specific method to be called cannot be determined at compile-time.

Figure 7:
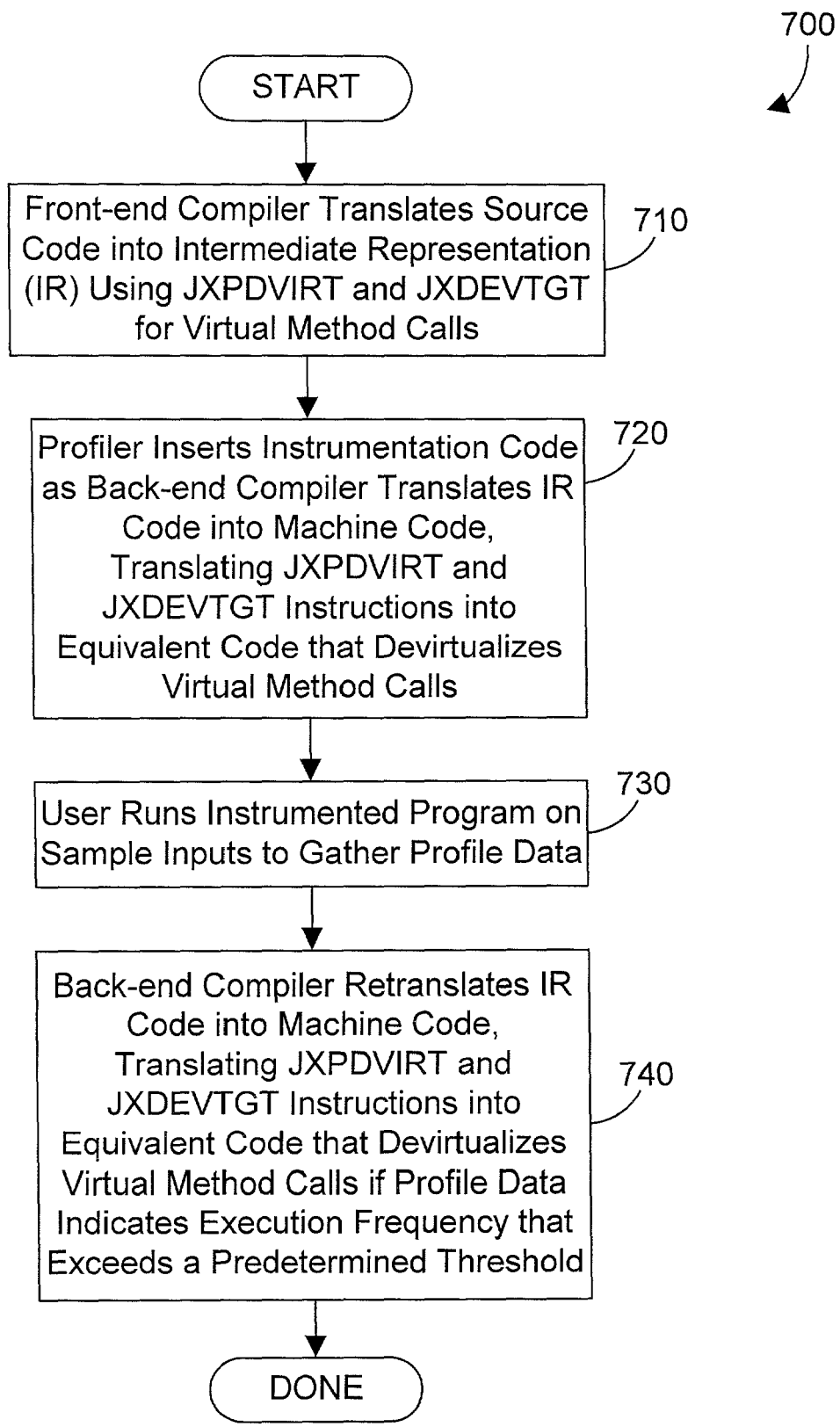
FIG. 7 is a flow diagram of a method for devirtualizing virtual method calls in accordance with the preferred embodiments.

Referring now to FIG. 7, a method 700 in accordance with the preferred embodiments begins by the front-end compiler translating the source code input into the intermediate representation using special JXPDVIRT and JXDEVTGT instructions (step 710). These two instructions are new instructions defined in the intermediate representation in accordance with the present invention that specifically relate to virtual method calls. The back-end compiler then processes the intermediate representation. First, the profiler in the back-end compiler inserts instrumentation code into the machine code, while translating the JXPDVIRT and JXDEVTGT instructions into equivalent code that devirtualizes the virtual method calls (step 720). Note that the term "devirtualizes the virtual method calls" is used broadly herein to mean that a virtual method call is either completely devirtualized (meaning that explicit calls are generated for all of its target methods, or partially devirtualized (meaning that explicit calls are generated for only some of its target methods). If all target methods are present in the current compilation unit, complete devirtualization is possible. However, when one or more target methods may be defined in a different compilation unit, they cannot be devirtualized in the current compilation unit. As a result, in many circumstances, only partial devirtualization of a virtual method call is possible.

Next, a user runs the instrumented program (i.e., machine code generated on the first pass of the back-end compiler) on sample inputs to gather profile data (step 730). The back-end compiler then retranslates the intermediate representation into machine code, translating the JXPDVIRT and JXDEVTGT instructions into equivalent code if the profile data indicates that the execution frequency for a particular explicit method call exceeds a predetermined threshold (step 740). These steps will be explained in more detail below with reference to FIGS. 8-13.

In the prior art, when a front-end compiler encounters the virtual method call in FIG. 4, one known way to handle the virtual method call is to emit the code shown in FIG. 8. We assume for this example that the front-end compiler processes source code in the Java programming language, and that the intermediate representation is the New Machine Interface (NMI) used on IBM iSeries computers. First, the argument 100 is pushed onto the stack (line 810). Next, the addressing expression for the called procedure is pushed onto the stack (line 820). Finally, a CALLPP instruction is inserted that indicates a dictionary entry D1 describing the function call parameter types and the number of pushed arguments (line 830). The CALLPP instruction is a "CALL through Procedure Pointer" instruction that indicates an indirect call. Of course, a virtual method call is one example of an indirect call. For this reason, the CALLPP instruction is used in the intermediate representation code to represent a virtual method call in the source code. Note that the CALLPP instruction cannot be optimized by the back-end compiler 120 in the prior art because it is unknown at compile-time which method will be actually executed at run-time. The code in FIG. 8 is a portion of the code that is emitted by the front-end compiler 110 of FIG. 1 when step 210 of FIG. 2 is performed.

Instead of generating the code of FIG. 8, as does the prior art, the front-end compiler 610 of the preferred embodiments instead generates the code shown in FIG. 9. First, the argument 100 is pushed onto the stack (line 910). Next, the addressing expression for the rot( ) function in myFruit's virtual function table is pushed onto the stack (line 920), which corresponds to the method_info of the method actually invoked at run-time. Note that a "method_info" is just a run-time structure for Java describing a method to be called, whether virtual or otherwise. In other languages, the method addresses could be used directly instead of using the method_info address. Next, the addressing expression for the method_info of Fruit.rot( ), Orange.rot( ), and Banana.rot( ) are pushed onto the stack (lines 930, 940 and 950). The addressing expression for the called procedure is then pushed onto the stack (line 960). At this point two new instructions are defined by the preferred embodiments. A JXPDVIRT instruction (line 970) stands for JavaX Partially DeVIRTualized method call, while the JXDEVTGT (lines 982, 984 and 986) stands for JavaX DEVirtualizaiton TarGeT. JavaX stands for the Java Transformer front end, used on IBM iSeries computer systems to convert Java class and archive (i.e., jar) files into NMI (i.e., intermediate representation) instructions. We assume that D100 is a dictionary entry corresponding to the Fruit.rot( ) method; D200 is a dictionary entry corresponding to the Orange.rot( ) method; and D300 is a dictionary entry corresponding to the Banana.rot( ) method. The code in FIG. 9 is a portion of the code that is emitted by the front-end compiler 610 of FIG. 6 when step 710 of FIG. 7 is performed.

We assume the intermediate representation 615, which includes the JXPDVIRT and JXDEVTGT instructions shown in FIG. 9, is then processed by the back-end compiler (step 720 of FIG. 7). The back-end compiler translates the JXPD-VIRT and JXDEVTGT instructions in the intermediate representation of FIG. 9 into the equivalent code shown in FIG. 10, assuming that Fruit, Orange, and Banana are all defined within the current compilation unit. First, the argument 100 is pushed onto the stack (line 1010). Next, a test is performed to see whether the run-time method info address is the same as the method_info address for target D100 (line 1020). If so, a CALLBP instruction is executed, passing D100 and the number of arguments (1). CALLBP is a "Call to Bound Procedure" instruction that indicates that the call is a direct procedure call, not an indirect call as with CALLPP. Next, the code at line 1040 tests to see if the run-time target method is the D200 method. If so, a CALLBP instruction is executed that specifies D200 as the target, with one specified argument (line 1050). Next, the code at line 1060 tests to see if the run-time target method is the D300 method. If so, a CALLBP instruction is executed that specifies D300 as the target, with one specified argument (line 1070). If the run-time call is to neither of D100, D200, nor D300, this means that the call is to some other method that is not in the current compilation unit. In this case, the addressing expression for the called procedure is pushed onto the stack (line 1080), and a CALLPP instruction is executed that specifies the virtual method call D1 with one argument (line 1090). In this manner, the code of FIG. 10 has explicit branches that may be taken for certain method calls, yet still includes a default that is equivalent to the prior art CALLPP instruction for any call that is not to one of the explicitly-defined methods (i.e., D100, D200, and D300 in FIG. 10).

Figure 11:
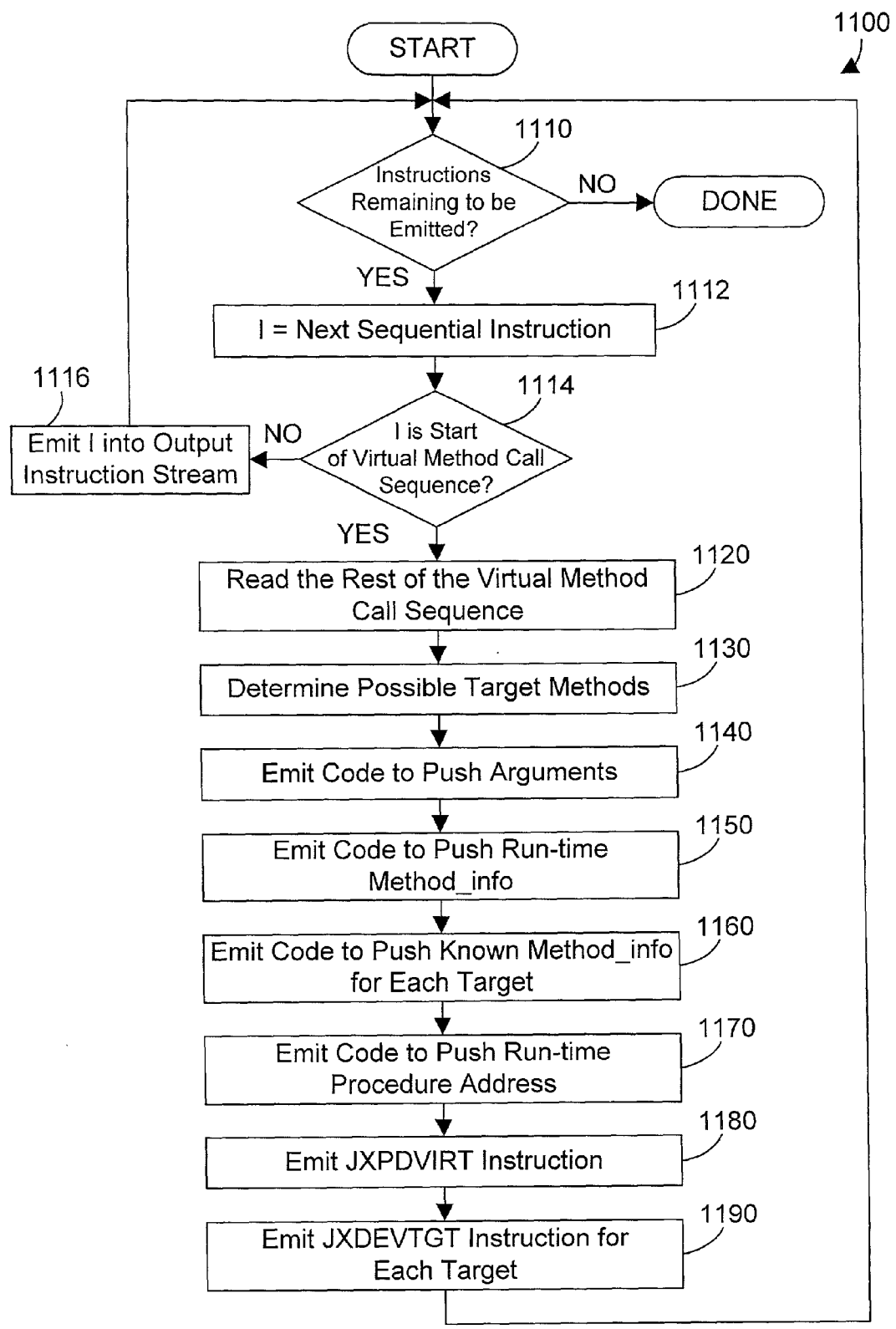
FIG. 11 is a flow diagram of a method for the front-end compiler to emit intermediate code in accordance with the preferred embodiments.
Figure 12:
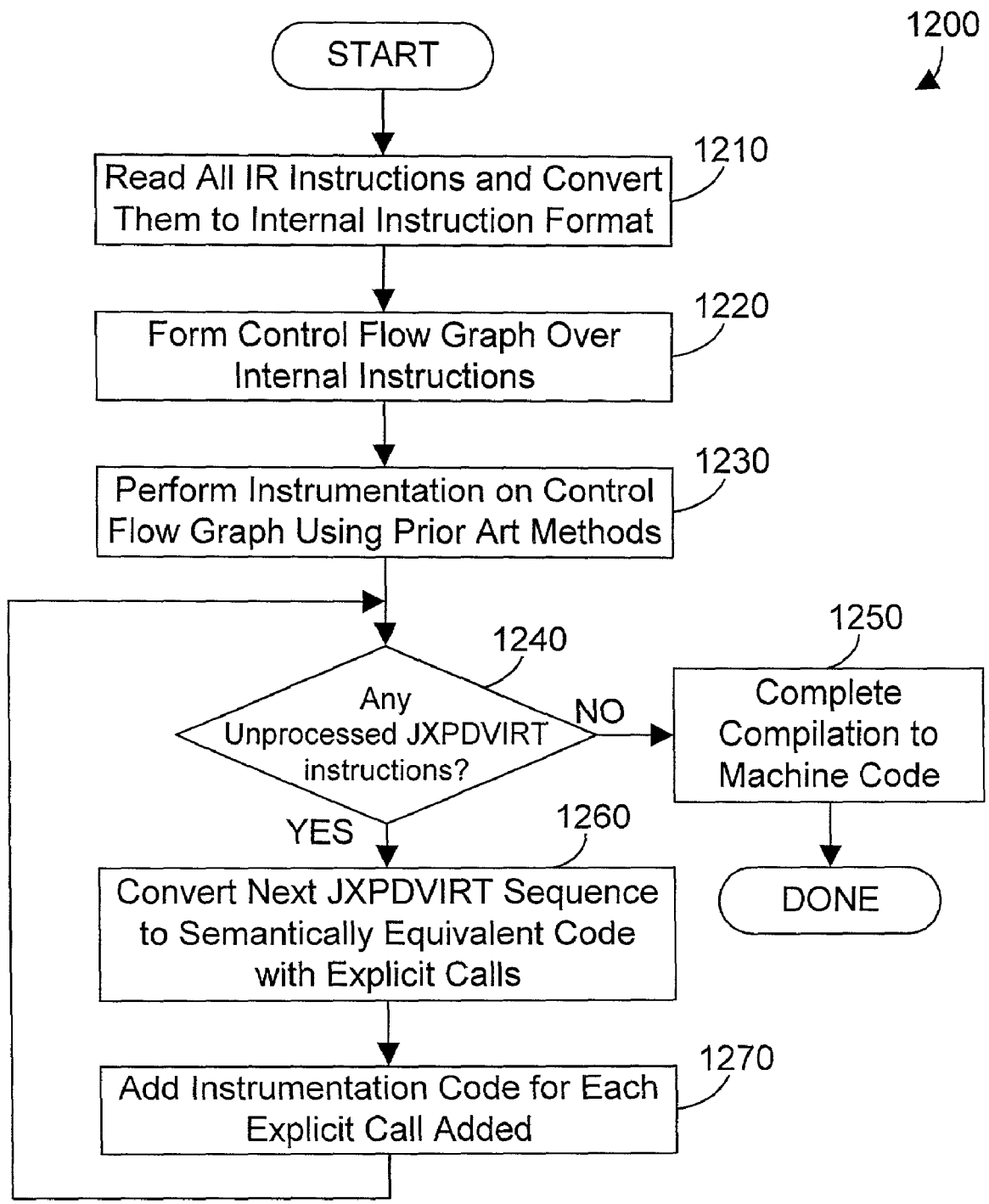
FIG. 12 is a flow diagram of a method for a back-end compiler to process devirtualization instructions in the intermediate representation code in accordance with the preferred embodiments.
Figure 13:
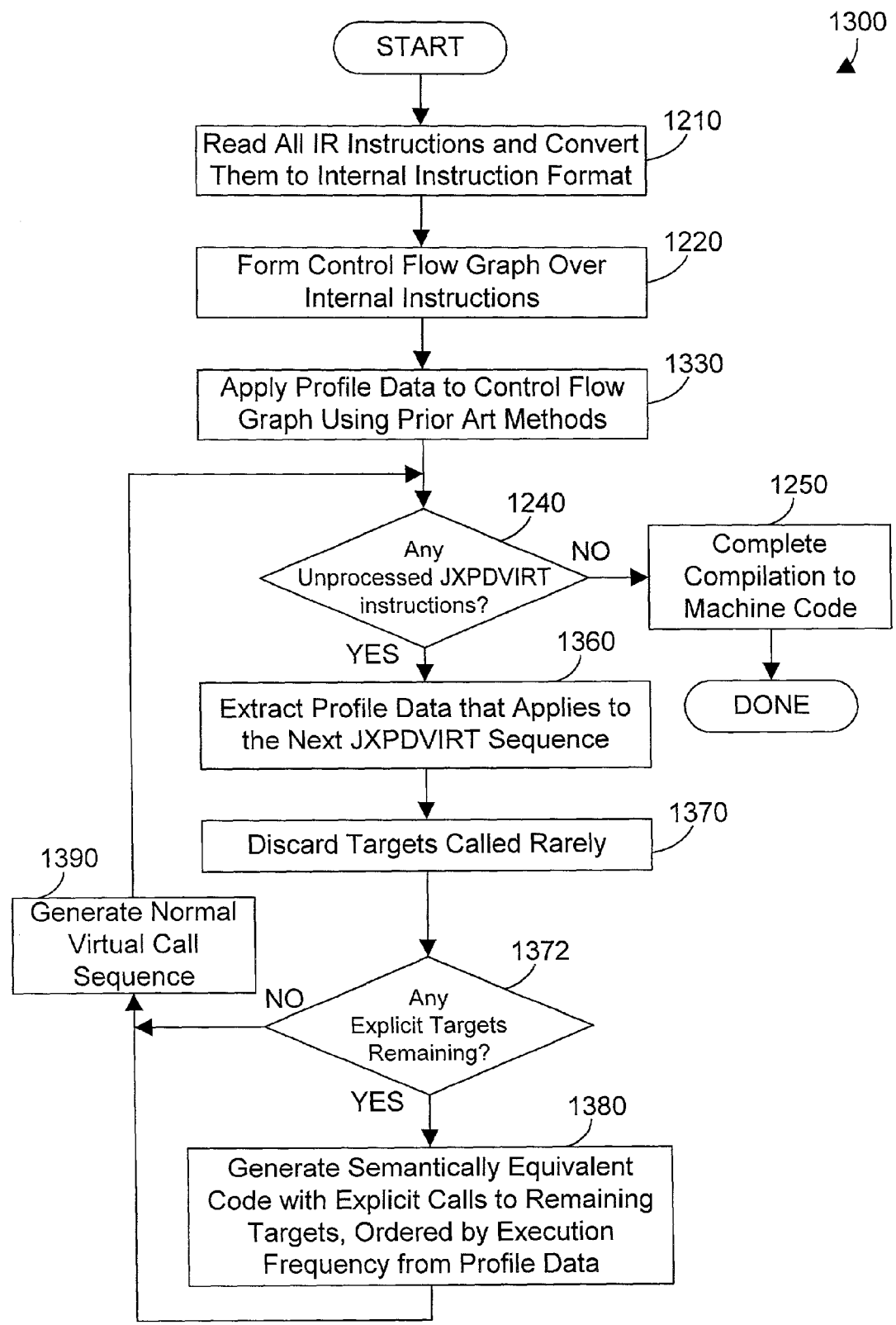
FIG. 13 is a flow diagram of a method for a back-end compiler to generate machine code using profile data for devirtualized method calls in accordance with the preferred embodiments.

Flow diagrams of methods in accordance with the preferred embodiments are shown in FIGS. 11-13. Referring now to FIG. 11, a method 1100 in accordance with the preferred embodiments represents the steps performed by a front-end compiler 610 during the execution of step 710 of FIG. 7. Assuming there are still instructions to be emitted (step 1110=YES), the next instruction I in the sequence is selected (step 1112). If I is not the start of a virtual method call sequence (step 1114=NO), the instruction I is emitted into the output instruction stream (step 1116), and control is returned to step 1110. If I is the start of a virtual method call sequence (step 1114=YES), the rest of the virtual method call sequence is read (step 1120). Note that FIG. 8 in its entirety is an example of a virtual call sequence. The possible target methods for the virtual method call are determined (step 1130). Code is then emitted to push the arguments onto the stack (step 1140). Next, code is emitted to push the run-time Method_info onto the stack (step 1150). Code is then emitted to push the known Method_info for each target onto the stack (step 1160). Code is then emitted to push the run-time procedure address onto the stack (step 1170). One JXPDVIRT instruction is then emitted (step 1180), followed by one JXDEVTGT instruction for each target method (step 1190). This process continues until all instructions have been emitted (step 1110=NO). In this manner a front-end compiler emits instructions in the intermediate representation that include special instructions (namely JXPDVIRT and JXDEVTGT for the specific example in the drawings) that allow a virtual method call to be devirtualized in the back-end compiler. For the virtual method call in FIG. 4, step 1140 in FIG. 11 generates line 910 in FIG. 9; step 1150 generates line 920; step 1160 generates lines 930, 940 and 950; step 1170 generates line 960; step 1180 generates line 970; and step 1190 generates lines 982, 984, and 986.

Referring now to FIG. 12, a method 1200 shows steps performed by a back-end compiler (such as back-end compiler 620 of FIG. 6) on its first pass in accordance with the preferred embodiments. First, the IR instructions received from the front-end compiler are read, and are converted to internal instruction format (step 1210). Next, a control flow graph is formed over the machine code instructions (step 1220). Instrumentation is then performed on the control flow graph using prior art methods (step 1230). This instrumentation is typically instrumentation code that increments counters as each portion of code is executed. For an example of prior art instrumentation using a control flow graph, see Schmidt et al., "Profile-directed Restructuring of Operating System Code", IBM Systems Journal 37(2), 1998, p. 270-297. If there are no JXPDVIRT instructions in the internal instructions (step 1240=NO), the back-end compiler completes the compilation to machine code (step 1250). If there are one or more JXPDVIRT instructions to process (step 1240=YES), the next JXPDVIRT sequence is converted to the semantically equivalent code with explicit calls (step 1260). This process was illustrated above by showing how the JXPDVIRT and JXDEVTGT instructions in FIG. 7 were converted to the equivalent code in FIG. 8 with explicit calls. Next, the instrumentation (i.e., code to increment a counter) for each explicit call is added to the machine code (step 1270). This process continues until all JXPDVIRT instructions have been processed (step 1240=NO), at which time the back-end compiler may complete the compilation into machine code (step 1250).

Method 1200 of FIG. 12 results in executable machine code that may include instrumentation code for profiling. We assume that the machine code that is the output of method 1200 is then executed with sample inputs, allowing profile data to be collected that indicates the frequency of execution for the different portions of machine code. Note that the profile data will include execution frequency for the explicit method calls that were generated from the JXPDVIRT and JXDEVTGT instructions. Referring now to FIG. 13, a method 1300 in accordance with the preferred embodiments shows how a back-end compiler may use the profile information when performing the second pass (or compile) to generate equivalent code for some explicit method calls while having a normal virtual call sequence (as is known in the art) for all method calls that do not need to have explicit calls for performance reasons. Note that steps 1210, 1220, 1240 and 1250 are the same steps shown in FIG. 12 and discussed above. Step 1230 in the first pass instruments the code, while step 1330 in the second pass applies the profile data to the control flow graphs using prior art methods discussed in the Schmidt et al reference cited above. One difference in method 1300 is how the JXPDVIRT sequences are processed. If there is an unprocessed JXPDVIRT instruction (step 1240=YES), the profile data that applies to the next JXPDVIRT sequence is extracted (step 1360). Target methods that are called rarely are discarded (step 1370). By "discarded" we mean that it is not necessary to generate explicit calls for these methods because the default virtual call sequence may be used, because the frequency of execution is low. After discarding target methods that are rarely called (step 1370), if any explicit targets remain that were generated from a JXPDVIRT sequence (step 1372=YES), semantically equivalent code with explicit calls is generated for each remaining target method, with the order of the calls being determined by the frequency of execution indicated by the profile data (step 1380). Next, the normal virtual call sequence is generated (step 1390). Note that if there are no explicit targets remaining after discarding target methods that were called rarely (step 1372=NO), the normal virtual call sequence is generated (step 1390) without generating any equivalent code with explicit calls. In the prior art for the Java programming language, the "normal" virtual call sequence is shown in FIG. 8.

Method 1300 of FIG. 13 covers partial devirtualizations. We assume that one or more methods will not or cannot be devirtualized, and we therefore need the prior art CALLPP instruction generated in step 1390. Note, however, that it may also be possible to do full devirtualization within the scope of the preferred embodiments. If all target methods are known within the current compilation unit, and have profile data that exceeds the predetermined threshold, an explicit call can be generated for each target method, and no CALLPP instruction would be required. In other words, in the full devirtualization case, step 1390 would not be performed. If partial devirtualization and full devirtualization need to be treated differently (e.g., generating a CALLPP for partial devirtualization and not generating a CALLPP for full devirtualization), another argument could be passed with the JXPDVIRT instruction to indicate to the back-end compiler whether to use partial or full devirtualization.

Note that step 1370 may define "rarely" using any suitable heuristic. The point is that a predetermined threshold is defined, and explicit target methods that were generated for a JXPDVIRT sequence that have an execution frequency (indicated by the profile data) that exceeds the predetermined threshold will have semantically equivalent code with the explicit call in the machine code, while those that have an execution frequency that does not exceed the predetermined threshold will not have any semantically equivalent code generated, but will instead rely upon the standard virtual call sequence. Note that the "threshold" can be any suitable number, including the number of times a method is executed, the percentage of times a method is executed compared to other target methods for the same virtual method call, the ratio of the number of times a method is executed to the number of times other target methods were executed, and any other suitable number representative of the collected profile data.

The result of method 1300 is a machine code instruction stream that includes an explicit call to a target method when the execution frequency of the target method indicated by the profile data exceeds some threshold value. For the virtual method call in FIG. 4, and the first-pass machine code of FIG. 10, the resulting second-pass machine code is shown in FIG. 14, based on our earlier assumption that the profile indicates that the Fruit.rot( ) method was invoked 110 times, the Orange.rot( ) method was invoked 150 times, and the Banana.rot( ) method was invoked only twice. We assume an arbitrary threshold value of 50, and that any method that was executed less than 50 times will not have an explicit method call in the second-pass machine code. As a result, we see that FIG. 14 has no explicit call to D300, which corresponds to the Banana.rot( ) method, because this method was only invoked twice during the execution of the first pass machine code that generated the profile data. In addition, note that the order of the remaining expressions has been changed to reflect the order of execution frequency in the profile data. In other words, in the second pass code shown in FIG. 14, the "if" statement and its associated CALLBP instruction for D200 (lines 1420 and 1430) occur before the "if" statement and its associated CALLBP D100 instruction (lines 1440 and 1450) because the Orange.rot( ) method (that corresponds to D200) was executed more times (150) than the number of times the Fruit.rot( ) method was executed (110). As stated in step 1380, the explicit calls that remain in the final machine code due to their profile data are ordered according to their execution frequency. By placing the explicit calls that are executed most frequently first, the likelihood is greatest that the first if-then instruction will be executed, thereby enhancing the performance of the final machine code. Note that lines 1410, 1460 and 1470 of FIG. 14 are similar to respective lines 1010, 1080 and 1090 of FIG. 10.

Note that if the source code contains no virtual method calls, the machine code output by the back-end compiler would be identical to the machine code output by a prior art back-end compiler. The present invention simply recognizes that there are some cases where the performance of a machine code instruction stream may be optimized by explicitly calling methods that are often called (according to profile data) via a virtual method call, while allowing other methods that are less often called to be handled by the traditional virtual call sequence used in the prior art. In this sense, a virtual method call may be "partially devirtualized" in accordance with the present invention, meaning that some of the target methods have explicit code while others are handled by a virtual method call in the machine code. Of course, those that have explicit code represent the devirtualized portion of the virtual method call.

Figure 15:
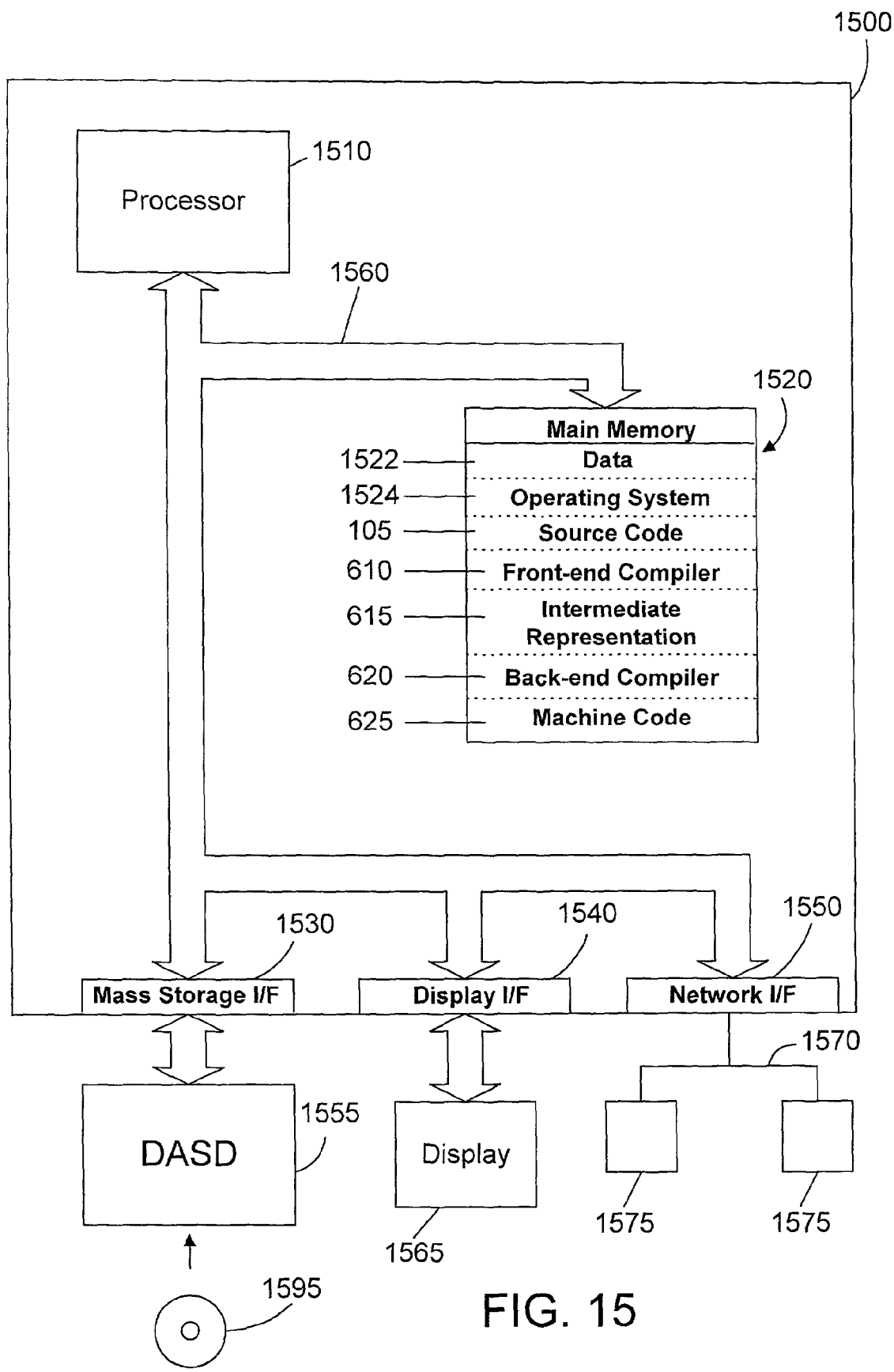
FIG. 15 is a block diagram of an apparatus in accordance with the preferred embodiments.

Referring now to FIG. 15, a computer system 1500 is one suitable implementation of an apparatus in accordance with the preferred embodiments of the invention. Computer system 1500 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 15, computer system 1500 comprises a processor 1510, a main memory 1520, a mass storage interface 1530, a display interface 1540, and a network interface 1550. These system components are interconnected through the use of a system bus 1560. Mass storage interface 1530 is used to connect mass storage devices (such as a direct access storage device 1555) to computer system 1500. One specific type of direct access storage device 1555 is a readable and writable CD ROM drive, which may store data to and read data from a CD ROM 1595.

Main memory 1520 in accordance with the preferred embodiments contains data 1522, an operating system 1524, source code 105, a front-end compiler 610, an intermediate representation 615, a back-end compiler 620, and machine code 625. Note that the source code 105, front-end compiler 610, intermediate representation 615, backend compiler 620, and machine code 625 were discussed in detail above with reference to FIGS. 6-14.

Note that the source code 105, front-end compiler 610, intermediate representation 615, back-end compiler 620, and machine code 625 are all shown residing in memory 1520 for the convenience of showing all of these elements in one drawing. One skilled in the art will appreciate that this is not the normal mode of operation for most compilers. Front-end compiler 610 processes source code 105 and generates therefrom intermediate representation 615. This processing may occur on a computer system separate from computer system 1500. Similarly, the back-end compiler 620 processes intermediate representation 615 and generates therefrom machine code 625, which may also occur on a separate computer system. In the extreme, source code 105 could reside on a first computer system and front-end compiler 610 could reside on a second computer system. Front-end compiler 610 could read the source code 105 from the first computer system, generate the intermediate representation 615, and store the intermediate representation 615 on a third computer system. Back-end compiler 620 could be executed on a fourth computer system, which reads the intermediate representation 615 from the third computer system, and generates therefrom machine code 625, which could be written to a fifth computer system. This simple example shows that the preferred embodiments expressly extend to any suitable configuration and number of computer systems to accomplish the front-end and back-end compiling described herein. The "apparatus" described herein and in the claims expressly extends to a multiple computer configuration, as described by the example above.

Computer system 1500 utilizes well known virtual addressing mechanisms that allow the programs of computer system 1500 to behave as if they only have access to a large, single storage entity instead of access to multiple, smaller storage entities such as main memory 1520 and DASD device 1555. Therefore, while data 1522, operating system 1524, source code 105, front-end compiler 610, intermediate representation 615, back-end compiler 620, and machine code 625 are shown to reside in main memory 1520, those skilled in the art will recognize that these items are not necessarily all completely contained in main memory 1520 at the same time. It should also be noted that the term "memory" is used herein to generically refer to the entire virtual memory of computer system 1500, and may include the virtual memory of other computer systems coupled to computer system 1500.

Data 1522 represents any data that serves as input to or output from any program in computer system 1500. Operating system 1524 is a multitasking operating system known in the industry as OS/400; however, those skilled in the art will appreciate that the spirit and scope of the present invention is not limited to any one operating system.

Processor 1510 may be constructed from one or more microprocessors and/or integrated circuits. Processor 1510 executes program instructions stored in main memory 1520. Main memory 1520 stores programs and data that processor 1510 may access. When computer system 1500 starts up, processor 1510 initially executes the program instructions that make up operating system 1524. Operating system 1524 is a sophisticated program that manages the resources of computer system 1500. Some of these resources are processor 1510, main memory 1520, mass storage interface 1530, display interface 1540, network interface 1550, and system bus 1560.

Although computer system 1500 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 1510. However, those skilled in the art will appreciate that the present invention applies equally to computer systems that simply use I/O adapters to perform similar functions.

Display interface 1540 is used to directly connect one or more displays 1565 to computer system 1500. These displays 1565, which may be non-intelligent (i.e., dumb) terminals or fully programmable workstations, are used to allow system administrators and users to communicate with computer system 1500. Note, however, that while display interface 1540 is provided to support communication with one or more displays 1565, computer system 1500 does not necessarily require a display 1565, because all needed interaction with users and other processes may occur via network interface 1550.

Network interface 1550 is used to connect other computer systems and/or workstations (e.g., 1575 in FIG. 15) to computer system 1500 across a network 1570.

The present invention applies equally no matter how computer system 1500 may be connected to other computer systems and/or workstations, regardless of whether the network connection 1570 is made using present-day analog and/or digital techniques or via some networking mechanism of the future. In addition, many different network protocols can be used to implement a network. These protocols are specialized computer programs that allow computers to communicate across network 1570. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 1595 of FIG. 15), and transmission type media such as digital and analog communications links.

The preferred embodiments described herein allow optimizing a machine code instruction stream by partially devirtualizing a virtual method call. This is done by a front-end compiler emitting special instructions that indicate a virtual method call. The back-end compiler processes these instructions, expanding them into semantically equivalent machine code for each target method in the compilation unit during the first pass. The machine code is then executed using sample inputs to generate profile data. The profile data is used to determine whether the explicit method calls generated on the first pass for each target method should be in the final machine code. If the explicit method calls were executed a sufficient number of times as indicated by the profile data, the semantically equivalent explicit method call will be generated in the machine code during the second pass of the back-end compiler. If, however, an explicit method call was not executed a sufficient number of times, a normal virtual method call sequence (as known in the art) will be generated. The present invention thus allows devirtualization of a virtual method call to occur in a back-end compiler, even though type information has been lost by that time. The benefits include a faster optimization step (since the front end is not re-executed), and more importantly, confining the profiling process to a single common back end for all languages.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the preferred embodiments presented herein deal with virtual method calls in an object oriented program. Object oriented languages allow a compiler to determine at compile-time which target methods are present in the current compilation unit for a particular virtual method call. Note, however, that the principles of the present invention extend to the more general case of any indirect call with at least one target that is known to the front-end compiler. In this case, the concepts of the present invention could be used to "de-indirect" the call by generating code that explicitly calls a known target if the known target is executed more than a predetermined threshold as indicated in the profile data.

What is claimed is:

1. An apparatus comprising:
   at least one processor;
   a memory coupled to the at least one processor;
   source code residing in the memory, the source code including at least one indirect call; and
   a front-end compiler residing in the memory and executed by the at least one processor, the front-end compiler processing the source code and generating therefrom an instruction stream that includes a first instruction that indicates a first indirect call and at least one other instruction that identifies a potential target for the first indirect call;
   a back-end compiler residing in the memory and executed by the at least one processor, wherein the back-end compiler processes the instruction stream and generates therefrom machine code that includes an explicit call for at least one potential target for the first indirect call, wherein the back-end compiler comprises a profiler that determines execution frequency for at least one portion of machine code generated by the back-end compiler as the machine code is executed with sample inputs, the execution frequency comprising profile data, wherein the back-end compiler processes the intermediate representation code a first time and generates therefrom first machine code that includes an explicit call for the at least one potential target for the indirect call, and wherein the back-end compiler processes the intermediate representation code a second time using the profile data to determine which, if any, target for the indirect call for which to generate an explicit call in second machine code generated by the back-end compiler.

2. The apparatus of claim 1 wherein the second machine code comprises multiple explicit calls for multiple targets for a selected indirect call, the back-end compiler ordering the multiple explicit calls from an explicit call with the highest execution frequency to an explicit call with the lowest execution frequency as indicated by the profile data.

3. The apparatus of claim 1 wherein the back-end compiler generates an explicit call for a target in the second machine code if the profile data for the explicit call exceeds a predetermined threshold.

4. The apparatus of claim 1 wherein the back-end compiler generates an explicit call in the first machine code for each potential target that is present within a compilation unit that includes the source code.

5. An apparatus comprising:
at least one processor;
a memory coupled to the at least one processor;
intermediate representation code residing in the memory, the intermediate representation code including a first instruction that indicates a virtual method call and at least one other instruction that identifies a potential target method for the virtual method call; and
a back-end compiler residing in the memory and executed by the at least one processor, the back-end compiler processing the intermediate representation code and generating therefrom machine code that includes an explicit method call for at least one potential target method for the virtual method call, wherein the back-end compiler comprises a profiler that determines execution frequency for at least one portion of machine code generated by the back-end compiler as the machine code is executed with sample inputs, the execution frequency comprising profile data, wherein the back-end compiler processes the intermediate representation code a first time and generates therefrom first machine code that includes an explicit method call for the at least one potential target method for the virtual method call, and wherein the back-end compiler processes the intermediate representation code a second time using the profile data to determine which, if any, target method for the virtual method call for which to generate an explicit method call in second machine code generated by the back-end compiler.

6. The apparatus of claim 5 wherein the second machine code comprises multiple explicit method calls for multiple target methods for a selected virtual method call, the back-end compiler ordering the multiple explicit method calls from an explicit method call with the highest execution frequency to an explicit method call with the lowest execution frequency as indicated by the profile data.

7. The apparatus of claim 5 wherein the back-end compiler generates an explicit method call for a target method in the second machine code if the profile data for the explicit method call exceeds a predetermined threshold.

8. The apparatus of claim 5 wherein the back-end compiler generates an explicit method call in the machine code for each potential target method that is present within a compilation unit that includes object oriented source code from which the intermediate representation code was generated.

9. An apparatus comprising:
at least one processor;
a memory coupled to the at least one processor;
object oriented source code residing in the memory;
a front-end compiler residing in the memory and executed by the at least one processor, wherein the front-end compiler processes the object oriented source code and generates therefrom intermediate representation code that includes a first instruction that indicates a virtual method call and at least one other instruction that identifies a potential target method for the virtual method call;
a back-end compiler residing in the memory and executed by the at least one processor, wherein the back-end compiler processes the intermediate representation code a first time and generates therefrom first machine code that includes an explicit method call for the at least one potential target method for the virtual method call;
a profiling mechanism that executes the first machine code using sample inputs to measure execution frequency for at least one portion of the first machine code, the execution frequency comprising profile data;
wherein the back-end compiler processes the intermediate representation code a second time to generate second machine code using the profile data to determine which, if any, target method for the virtual method call for which to generate an explicit method call in the second machine code.

10. The apparatus of claim 9 wherein an explicit method call is generated for a target method in the second machine code if the profile data for the explicit method call exceeds a predetermined threshold.

11. The apparatus of claim 9 wherein the second machine code comprises multiple explicit method calls for multiple target methods for a selected virtual method call, the back-end compiler ordering the multiple explicit method calls from an explicit method call with the highest execution frequency to an explicit method call with the lowest execution frequency as indicated by the profile data.

12. A method for compiling source code comprising the steps of:
providing at least one processor;
providing a memory coupled to the at least one processor, the at least one processor performing the steps of:
(A) identifying at least one indirect call in the source code;
(B) generating from the source code an instruction stream that includes a first instruction that indicates the at least one indirect call and at least one other instruction that identifies a potential target method for the at least one indirect call;
(C) processing the instruction stream and generating therefrom machine code that includes an explicit call for at least one potential target for an indirect call;
(D) determining execution frequency for at least one portion of the machine code as the machine code is executed with sample inputs, the execution frequency comprising profile data;
(E) processing the intermediate representation code a first time and generating therefrom the first machine code that includes an explicit call for the at least one potential target for the indirect call; and (F) processing the intermediate representation code a second time using the profile data to determine which, if any, target for the indirect call for which to generate an explicit call in second machine code.

13. The method of claim 12 wherein the second machine code comprises multiple explicit calls for multiple targets for a selected indirect call and further comprises the step of ordering the multiple explicit calls from an explicit call with the highest execution frequency to an explicit call with the lowest execution frequency as indicated by the profile data.

14. The method of claim 12 further comprising the step of generating an explicit call for a target in the second machine code if the profile data for the explicit call exceeds a predetermined threshold.

15. The method of claim 12 further comprising the step of:
generating from the instruction stream first machine code that includes an explicit call for each potential target that is present within a compilation unit that includes the source code.

16. A method for processing intermediate representation code that includes a first instruction that indicates a virtual method call and at least one other instruction that identifies a potential target method for the virtual method call, the method comprising the steps of:
providing at least one processor;
providing a memory coupled to the at least one processor, the at least one processor performing the steps of:
(A) identifying the first instruction that indicates a virtual method call;
(B) processing the first instruction to generate therefrom first machine code that includes an explicit method call for at least one potential target method for the virtual method call indicated by the at least one other instruction;
(C) determining execution frequency for at least one portion of the first machine code as the first machine code is executed with sample inputs, the execution frequency comprising profile data; and
(D) processing the instruction stream a second time to generate second machine code using the profile data to determine which, if any, target method for the virtual method call for which to generate an explicit method call in the second machine code.

17. The method of claim 16 wherein the second machine code comprises multiple explicit method calls for multiple target methods for a selected virtual method call, the back-end compiler ordering the multiple explicit method calls from an explicit method call with the highest execution frequency to an explicit method call with the lowest execution frequency as indicated by the profile data.

18. The method of claim 16 further comprising the step of generating the explicit method call for a target method if the profile data for the explicit method call exceeds a predetermined threshold.

19. The method of claim 16 wherein step (B) comprises the step of generating an explicit method call for each potential target method that is present within a compilation unit that includes object oriented source code from which the intermediate representation code was generated.

20. A method for compiling object oriented source code comprising the steps of:
providing at least one processor;
providing a memory coupled to the at least one processor, the at least one processor performing the steps of:
identifying at least one virtual method call in the object oriented source code;
generating from the object oriented source code intermediate representation code that includes a first instruction that indicates the at least one virtual method call and at least one other instruction that identifies a potential target method for the at least one virtual method call;
processing the intermediate representation code and generating therefrom first machine code that includes an explicit method call for at least one potential target method for the virtual method call;
determining execution frequency for at least one portion of the first machine code as the first machine code is executed with sample inputs, the execution frequency comprising profile data; and
processing the intermediate representation code a second time to generate second machine code using the profile data to generate an explicit method call for a target method if the profile data for the target method exceeds a predetermined threshold.

21. The method of claim 20 wherein if multiple explicit method calls for target methods for a selected virtual method call are present in the second machine code, ordering the multiple explicit method calls from an explicit method call with the highest execution frequency to an explicit method call with the lowest execution frequency as indicated by the profile data.

22. A program product comprising:
(A) a front-end compiler that processes source code and generates therefrom an instruction stream that includes a first instruction that indicates a first indirect call and at least one other instruction that identifies a potential target for the first indirect call;
(B) a back-end compiler that processes the instruction stream and generates therefrom machine code that includes an explicit call for at least one potential target for the first indirect call, wherein the back-end compiler comprises a profiler that determines execution frequency for at least one portion of machine code generated by the back-end compiler as the machine code is executed with sample inputs, the execution frequency comprising profile data, wherein the back-end compiler processes the intermediate representation code a first time and generates therefrom first machine code that includes an explicit call for the at least one potential target for the indirect call, and wherein the back-end compiler processes the intermediate representation code a second time using the profile data to determine which, if any, target for the indirect call for which to generate an explicit call in second machine code generated by the back-end compiler; and
computer-readable recordable media bearing the front-end compiler and the back-end compiler.

23. The program product of claim 22 wherein the second machine code comprises multiple explicit calls for multiple targets for a selected indirect call, the back-end compiler ordering the multiple explicit calls from an explicit call with the highest execution frequency to an explicit call with the lowest execution frequency as indicated by the profile data.

24. The program product of claim 22 wherein the back-end compiler generates an explicit call for a target in the second machine code if the profile data for the explicit call exceeds a predetermined threshold.

25. The program product of claim 22 wherein the back-end compiler generates an explicit call in the machine code for each potential target that is present within a compilation unit that includes the source code.

26. A program product comprising:
(A) a back-end compiler that processes intermediate representation code that includes a first instruction that indicates a virtual method call and at least one other instruction that identifies a potential target method for the virtual method call, the back-end compiler generating from the intermediate representation code machine code that includes an explicit method call for at least one potential target method for the virtual method call, wherein the back-end compiler comprises a profiler that determines execution frequency for at least one portion of machine code generated by the back-end compiler as the machine code is executed with sample inputs, the execution frequency comprising profile data, wherein the back-end compiler processes the intermediate representation code a first time and generates therefrom first machine code that includes an explicit method call for the at least one potential target method for the virtual method call, and wherein the back-end compiler processes the intermediate representation code a second time using the profile data to determine which, if any, target method for the virtual method call for which to generate an explicit method call in second machine code generated by the back-end compiler; and
(B) computer-readable recordable media bearing the back-end compiler.

27. The program product of claim 26 wherein the second machine code comprises multiple explicit method calls for multiple target methods for a selected virtual method call, the back-end compiler ordering the multiple explicit method calls from an explicit method call with the highest execution frequency to an explicit method call with the lowest execution frequency as indicated by the profile data.

28. The program product of claim 26 wherein the back-end compiler generates an explicit method call for a target method in the second machine code if the profile data for the explicit method call exceeds a predetermined threshold.

29. The program product of claim 26 wherein the back-end compiler generates an explicit method call in the machine code for each potential target method that is present within a compilation unit that includes object oriented source code from which the intermediate representation code was generated.

30. A program product comprising:
(A) a front-end compiler that processes object oriented source code and generates therefrom intermediate representation code that includes a first instruction that indicates a virtual method call and at least one other instruction that identifies a potential target method for the virtual method call;
(B) a back-end compiler that processes the intermediate representation code a first time and generates therefrom first machine code that includes an explicit method call for the at least one potential target method for the virtual method call;
(C) a profiling mechanism that executes the first machine code using sample inputs to measure execution frequency for at least one portion of the first machine code, the execution frequency comprising profile data;
(D) wherein the back-end compiler processes the intermediate representation code a second time to generate second machine code using the profile data to determine which, if any, target method for the virtual method call for which to generate an explicit method call in the second machine code; and
(E) computer-readable recordable media bearing (A), (B) and (C).

31. The program product of claim 30 wherein the back-end compiler generates an explicit method call for a target method in the second machine code if the profile data for the explicit method call exceeds a predetermined threshold.

32. The program product of claim 30 wherein the second machine code comprises multiple explicit method calls for multiple target methods for a selected virtual method call, the back-end compiler ordering the multiple explicit method calls from an explicit method call with the highest execution frequency to an explicit method call with the lowest execution frequency as indicated by the profile data.

* * * * *